US012731233B2

(12) United States Patent
Guyduy

(10) Patent No.: US 12,731,233 B2
(45) Date of Patent: Sep. 8, 2026

(54) USING LUMINANCE DISTRIBUTIONS TO DETECT BEST AREAS OF AN IMAGE FOR PREDICTION OF NOISE LEVELS

(71) Applicant: CANON U.S.A., INC., Melville, NY (US)

(72) Inventor: Yevgeniy Gennadiy Guyduy, Bellmore, NY (US)

(73) Assignee: Canon U.S.A., Inc., Melville, NY (US)

( * ) Notice: Subject to any disclaimer, the term of this patent is extended or adjusted under 35 U.S.C. 154(b) by 447 days.

(21) Appl. No.: 18/035,712

(22) PCT Filed: Nov. 8, 2021

(86) PCT No.: PCT/US2021/058433
§ 371 (c)(1),
(2) Date: May 5, 2023

(87) PCT Pub. No.: WO2022/099121
PCT Pub. Date: May 12, 2022

(65) Prior Publication Data

US 2023/0410273 A1 Dec. 21, 2023

Related U.S. Application Data

(60) Provisional application No. 63/111,273, filed on Nov. 9, 2020.

(51) Int. Cl.
*G06T 7/00* (2017.01)
*G06T 7/11* (2017.01)

(52) U.S. Cl.
CPC .............. *G06T 7/0002* (2013.01); *G06T 7/11* (2017.01); *G06T 2207/20084* (2013.01); *G06T 2207/30168* (2013.01)

(58) Field of Classification Search
CPC ..................... G06T 7/0002; G06T 7/11; G06T 2207/20084; G06T 2207/30168; G06V 10/507; G06V 10/454; G06V 10/25
See application file for complete search history.

(56) References Cited

U.S. PATENT DOCUMENTS 7,813,583 B2 10/2010 Yoo et al.
8,908,989 B2 12/2014 Geisler et al.
(Continued)

FOREIGN PATENT DOCUMENTS

EP 1309185 A1 5/2003
JP 4463341 B2 5/2010
(Continued)

OTHER PUBLICATIONS

Jli, J. et al., "Towards Noise-resistant Object Detection with Noisy Annotations", Mar. 3, 2020, pp. 1-17.
(Continued)

*Primary Examiner* — Bobbak Safaipour
(74) *Attorney, Agent, or Firm* — Canon U.S.A., Inc., IP Division

(57) ABSTRACT

An image processing apparatus and method are provided whereby one or more memories stores instructions which, when executed by one or more processors configures the one or more processors to perform operations including obtaining image data stored in memory of a processing device, defining one or more regions of the image to be processed based on luminance values of the region, providing, as input data, the one or more defined regions of the image to an classifier that has been trained to use image data to estimate noise in an image to output a prediction that the input data is in a first class or a second class, calculating an average by predicted class, and labeling the obtained image as the first class or second class based on the calculated average.

12 Claims, 25 Drawing Sheets

(56) References Cited

U.S. PATENT DOCUMENTS

| | | | | |
|---|---|---|---|---|
| 10,043,243 | B2 | 8/2018 | Mativychuk et al. | |
| 10,664,966 | B2 | 5/2020 | Guo et al. | |
| 10,810,721 | B2 | 10/2020 | Mech et al. | |
| 2007/0165112 | A1 | 7/2007 | Shinmei et al. | |
| 2010/0182461 | A1 | 7/2010 | On | |
| 2013/0128056 | A1 * | 5/2013 | Chuang | H04N 17/002 382/305 |
| 2020/0034615 | A1 * | 1/2020 | Croxford | G06V 10/764 |
| 2020/0226744 | A1 | 7/2020 | Cohen et al. | |
| 2020/0234080 | A1 | 7/2020 | Ciller Ruiz et al. | |
| 2020/0294201 | A1 | 9/2020 | Planche et al. | |
| 2020/0327360 | A1 | 10/2020 | Samala | |
| 2021/0104021 | A1 * | 4/2021 | Sohn | G06T 5/70 |
| 2021/0374968 | A1 * | 12/2021 | Martinez | G06V 10/25 |
| 2022/0222816 | A1 * | 7/2022 | Carnell | G06T 7/0012 |
| 2023/0401821 | A1 * | 12/2023 | Guyduy | G06V 20/70 |

FOREIGN PATENT DOCUMENTS

| | | | |
|---|---|---|---|
| JP | 5594665 | B2 | 9/2014 |
| KR | 101538353 | B1 | 7/2015 |

OTHER PUBLICATIONS

Xu, R. et al., "Ensemble with estimation: seeking for optimization in class noisy data", International Journal of Machine Learning and Cybernetics (2020), Jun. 12, 2019, pp. 231-248, vol. 11.

* cited by examiner

| sample_number | pixel_value_1 | pixel_value_2 | pixel_value_3 | pixel_value_4 | pixel_value_5 | pixel_value_6 | pixel_value_7 | . | | . | pixel_value_252 | pixel_value_253 | pixel_value_254 | pixel_value_255 | pixel_value_256 |
|---|---|---|---|---|---|---|---|---|---|---|---|---|---|---|---|
| 1 | 0 | 0 | 0 | 0 | 0 | 0 | 0 | . | . | . | 0 | 0 | 9.96492E-05 | 0.000239198 | 0.00173749 |
| 2 | 0 | 0 | 0 | 1.99298E-05 | 0 | 1.99298E-05 | 0 | . | . | . | 5.97895E-05 | 0.000179369 | 9.96492E-05 | 0.000318878 | 0.00219808 |
| 3 | 0 | 0 | 0 | 0 | 0 | 0 | 0 | . | . | . | 0.000318878 | 0.001375159 | 0.002212213 | 0.015021321 | 0.02609094 |
| 4 | 0.000179389 | 0.002219128 | 0.000459457 | 0.000598597 | 0.000458386 | 0.000798597 | 0.000717474 | . | . | . | 0.001494739 | 0.002431441 | 0.002451371 | 0.018527596 | 0.04344707 |
| 5 | 0.003627232 | 0.003188846 | 0.002730589 | 0.001973085 | 0.001474809 | 0.001155931 | 0.000976583 | . | . | . | 0.000478316 | 0.000458386 | 0.000578867 | 0.000378667 | 0.00249814 |
| 6 | 0 | 0 | 0 | 0 | 0 | 0 | 0 | . | . | . | 0 | 0 | 0 | 0 | 0 |
| 7 | 0 | 0 | 0 | 0 | 0 | 0 | 0 | . | . | . | 0 | 0 | 0 | 0 | 0 |
| 8 | 0 | 0 | 0 | 1.99298E-05 | 0.000797194 | 0.00255102 | 0.003248585 | . | . | . | 0.007489512 | 0.00909808 | 0.008749202 | 0.009805485 | 0.00834708 |
| 9 | 0 | 0 | 0 | 0 | 0 | 0 | 0 | . | . | . | 0 | 0 | 0 | 0 | 0 |
| | | . | . | . | . | . | . | . | . | . | . | . | . | . | . |
| | | . | . | . | . | . | . | . | . | . | . | . | . | . | . |

Accuracy Score : 0.797270955165692
Report :

| | precision | recall | f1-score | support |
|---|---|---|---|---|
| 0 | 0.79 | 0.80 | 0.80 | 506 |
| 1 | 0.80 | 0.80 | 0.80 | 520 |
| accuracy | | | 0.80 | 1026 |
| macro avg | 0.80 | 0.80 | 0.80 | 1026 |
| weighted avg | 0.80 | 0.80 | 0.80 | 1026 |

Centered

Accuracy Score : 0.827485380116959
Report :

| | precision | recall | f1-score | support |
|---|---|---|---|---|
| 0 | 0.84 | 0.81 | 0.82 | 506 |
| 1 | 0.82 | 0.85 | 0.83 | 520 |
| accuracy | | | 0.83 | 1026 |
| macro avg | 0.83 | 0.83 | 0.83 | 1026 |
| weighted avg | 0.83 | 0.83 | 0.83 | 1026 |

Random

Accuracy Score : 0.834307992202729
Report :

| | precision | recall | f1-score | support |
| --- | --- | --- | --- | --- |
| 0 | 0.83 | 0.84 | 0.83 | 506 |
| 1 | 0.84 | 0.83 | 0.84 | 520 |
| accuracy | | | 0.83 | 1026 |
| macro avg | 0.83 | 0.83 | 0.83 | 1026 |
| weighted avg | 0.83 | 0.83 | 0.83 | 1026 |

Fig. 10D
Structured

Accuracy Score : 0.8206627680311891
Report :

| | precision | recall | f1-score | support |
| --- | --- | --- | --- | --- |
| 0 | 0.82 | 0.82 | 0.82 | 506 |
| 1 | 0.83 | 0.82 | 0.82 | 520 |
| accuracy | | | 0.82 | 1026 |
| macro avg | 0.82 | 0.82 | 0.82 | 1026 |
| weighted avg | 0.82 | 0.82 | 0.82 | 1026 |

Fig. 10E
Stitched

Accuracy Score : 0.878167641325536
Report :

| | precision | recall | f1-score | support |
| --- | --- | --- | --- | --- |
| 0 | 0.87 | 0.88 | 0.88 | 506 |
| 1 | 0.88 | 0.88 | 0.88 | 520 |
| accuracy | | | 0.88 | 1026 |
| macro avg | 0.88 | 0.88 | 0.88 | 1026 |
| weighted avg | 0.88 | 0.88 | 0.88 | 1026 |

Fig. 10F
Luminance
Range

USING LUMINANCE DISTRIBUTIONS TO DETECT BEST AREAS OF AN IMAGE FOR PREDICTION OF NOISE LEVELS

CROSS-REFERENCE TO RELATED APPLICATIONS

This application is a National Phase Application of International Application No. PCT/US2021/058433, filed Nov. 8, 2021 which claims the benefit of priority from U.S. Provisional Patent Application Ser. No. 63/111,273 filed on Nov. 9, 2020, the entirety of both application are hereby incorporated by reference.

BACKGROUND

Field

The present disclosure describes an improved technique for predicting noise images using convolutional neural network from areas selected using luminance range map.

Description of Related Art

After photographs are taken photographers often examine images for various quality aspects. One common image quality metric is noise. By reviewing the noise that appears in an image it is decided whether the image is of good quality and is a candidate for printing or to be kept, or if that image needs additional post processing or should be deleted.

One manner in which noise is detected or determined centers around detection of noise in very noisy images where noise typically appears universally thought out the image. Various methods exist including median or mean sliding windows or differential gradient estimations. Other methods include detection and de-noising of images using convolutional neural networks Most of these methods perform relatively well on images with very high levels of noise where it also often appears universally thought out the image. Most methods listed above are also focused on detection of artificial type of noise that can be modelled artificially such as Gaussian, log-normal, uniform, exponential, Poisson, salt and pepper, Rayleigh, speckle and Erlang By experimenting with internal real world images it has been found that artificial noise does not represent noise that's typically embedded in the image at the time of capture and, often times, is not found universally throughout the image. Additionally, depending on the type of camera used, noise in images can follow different distribution patterns. Another drawback associated with some of the aforementioned noise detection techniques is that given processing speed requirements they are typically performed using resized images. However, the same experimentation using real world images have showed that resizing of images greatly reduces or completely destroys image noise making prediction less accurate or impossible. One viable solution which has shown to remedy above shortcomings is to use targeted crop or multiple crops where noise is most likely to be present from original non resized image. The present disclosure remedies the above drawbacks

SUMMARY

According to an embodiment, an apparatus and method that is provided that includes one or more processors; and one or more memories storing instructions that, when executed, configures the one or more processors, to determine and identify one or more best segments within images for input to a trained classifier trained to estimate noise based on data collected from various mobile and DSLR camera devices and estimate and obtain an area within images for prediction of noise and predicts whether the image is noisy or non-noisy based on identified area.

An image processing apparatus and method are provided whereby one or more memories stores instructions which, when executed by one or more processors configures the one or more processors to perform operations including obtaining image data stored in memory of a processing device, defining one or more regions of the image to be processed based on luminance values of the region, providing, as input data, the one or more defined regions of the image to an classifier that has been trained to use image data to estimate noise in an image to output a prediction that the input data is in a first class or a second class, calculating an average by predicted class; and labeling the obtained image as the first class or second class based on the calculated average.

In other embodiments, the apparatus and method are further configured to perform operations including dividing the obtained image data into predetermined segments of image data, and wherein the defining of one or more regions of the image is performed within each of the predetermined segments.

In other embodiments, the apparatus and method are further configured to perform operations including providing, as the input data, one or more defined regions in each of the predetermined segments to the classifier to output predictions for each of the one or more defined regions in each of the segments, and calculating the average by predicted class across all of the predetermined segments to generate the label for the image.

In a further embodiment, the apparatus and method are further configured to perform operations including defining one or more regions of the image to be processed based on luminance values of the region by subtracting each value of a determined luminance array of the image from a central luminance value to identify a central point around which a respective one of the one or more regions is defined and generating a bounding box having a predetermined size having the identified central point at a center; and providing the image data within the generated bounding box to the classifier. In some instances, the central luminance value is a luminance value closest to a median luminance value of the image.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIG. 7 is a schematic representation of the algorithm of the present disclosure.

Figure 1:
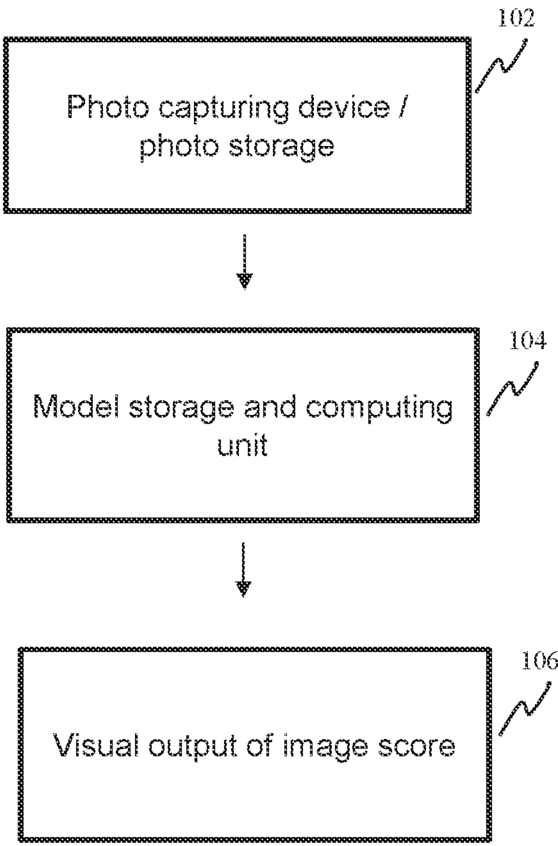
FIG. 1 is flow diagram of an image scoring algorithm of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

The present disclosure describes an improved technique for predicting noise images using convolutional neural network from areas selected using luminance range map. The present disclosure advantageously improves what is conventionally a manual process by providing a technique that takes into account specifics of spatial noise distribution in an image in order to estimate and obtain the best area for prediction of noise in an image and predict image as noisy or non noisy based on patch identified.

FIG. 1 shows a photo scoring system and algorithm for scoring images based on detected noise. An image capture device is shown in 102. The image capture device 102 may be a camera or other device that has a camera integral therewith such as a smartphone. The image capture device 102 includes processing circuitry and optical elements to capture images thereon and store the capture images in a storage of device 102. In other embodiments, the device 102 may be an image repository such as a cloud storage whereby previously captured images are stored and from where those images can be retrieved for further image processing according to the algorithms described herein. Estimation apparatus 104 is provided and receives images that have been captured by device 102. The estimation apparatus 104 includes one or more processors that execute stored instructions for performing estimation processing that estimates noise in the image being processed and then assigns a quality score to the image based on the result of the estimation processing. A display 106 is provided such that the quality score indicator is controlled to be displayed on display 106. This provides a visual representation of a quality of an image based on the estimated noise contained therein.

Figures 11A, 11B:
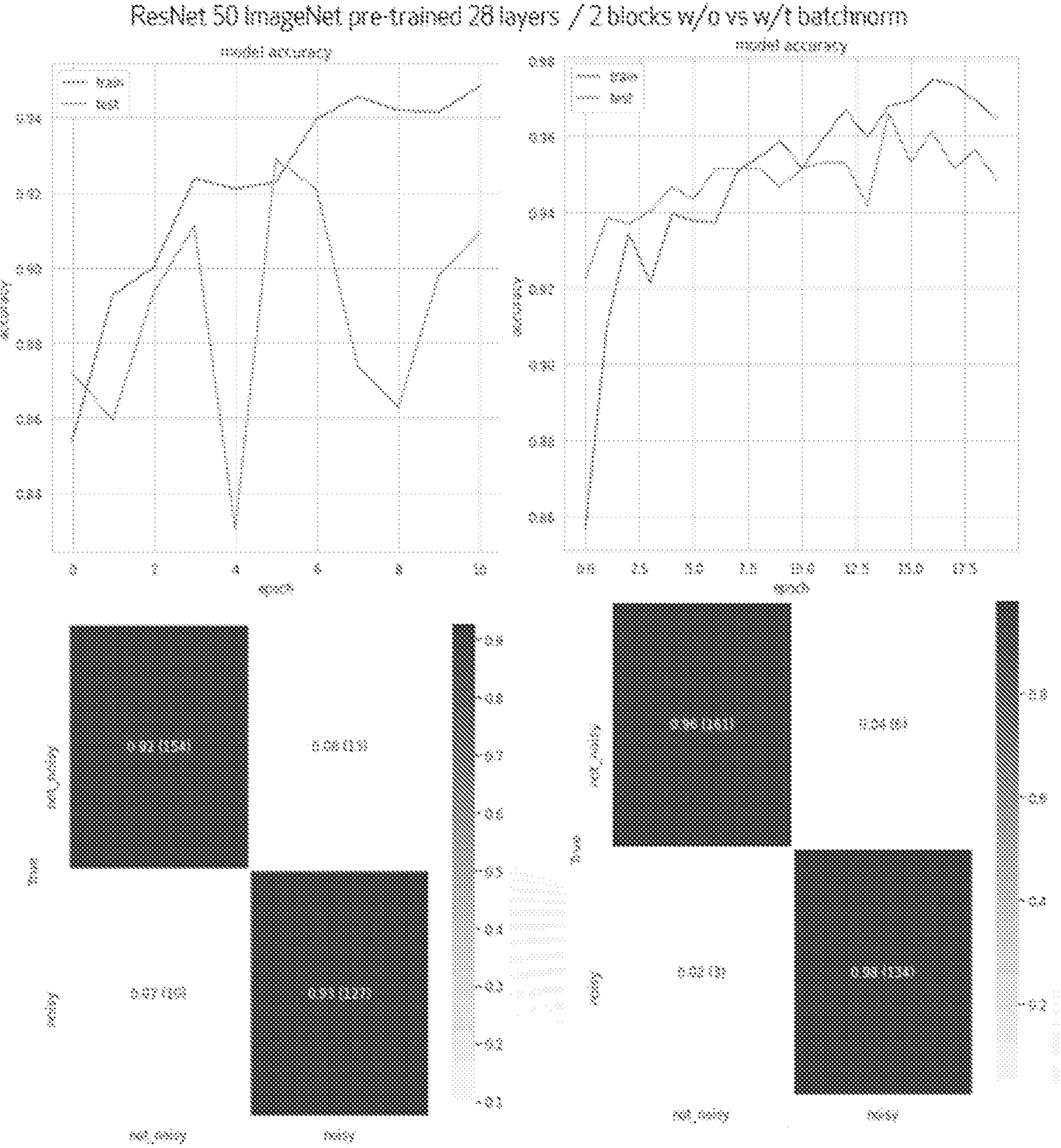
FIGS. 11A-11B illustrate accuracy of the image scoring algorithm of the present disclosure.

The estimation apparatus 104 in FIG. 1 performs noise estimation using a trained machine learning model that is trained to generate a binary classifier that can successfully be used to evaluate images. The process for obtaining the trained classifier is illustrated in the training algorithm of FIG. 2. At 200, the training processing for training a classifier in order to be able to predict noise in an image is initiated. In step 202, a set of labeled training images are obtained. The labeled training images includes a plurality of images labeled as noisy and images labeled as non-noisy. These training images serve as the basis for the classifier to be trained. In step 204, bounding boxes are obtained with X & Y coordinates in noisy images in order to focus only on noisy parts of the particular training image being processed. These labeled training images are labeled by experts in the field. In step 206, all areas of non-noisy images and bounding boxes of noisy images are cropped into non overlapping image segments (e.g. patches) of predetermined size which are then fed into classifier. Each patch is then relabeled according to its class: noisy or non-noisy. The cropping step is performed to improve the training process because, while machine learning networks (e.g. neural networks) are typically trained on resized images for speed, the benefits problems such as object recognition and others where an original size image can represent similar features as a resized one. With noise this is not the case. As such, the present step crops as many images as possible out of noisy and non noisy labeled areas for as much non resized training material as possible. In step 208, the classifier is built using the training data output from 206. The classifier uses transfer-learning technique and consist of first 28 layers/first 2 blocks of a pre trained on model having a global average pooling layer and a dense layer with 2 softmax units added in order to allow the model to classify between two classes. Since in most cases noise is random the first few blocks of the model were able to use a predetermined number of layers of a previously trained model to use high level features learned previously to estimate noise. All other layers past the predetermined layer number were discarded. In one embodiment, the first 28 layers of the previously trained model were used with all layers beyond layer 28 being discarded. Thereafter, the training process unfreezes all batch normalization layers (technique, which thru experimentation has proved to increase model accuracy) and last added layers described above for training what is at this stage is a fully convolutional classifier which is then stored in step 210. The stored classifier is then used by the estimation apparatus 104 to evaluate images for noise as described below. FIG. 9 shows final layout of the model. FIGS. 11A and 11B shows the accuracy resulting from the difference in training only last added layers (FIG. 11A) vs training last added layers and batch normalization layers only with everything else frozen (FIG. 11B):

Total params: 4,104,066
Trainable params: 20,354
Non-trainable params: 4,083,712

Figure 2:
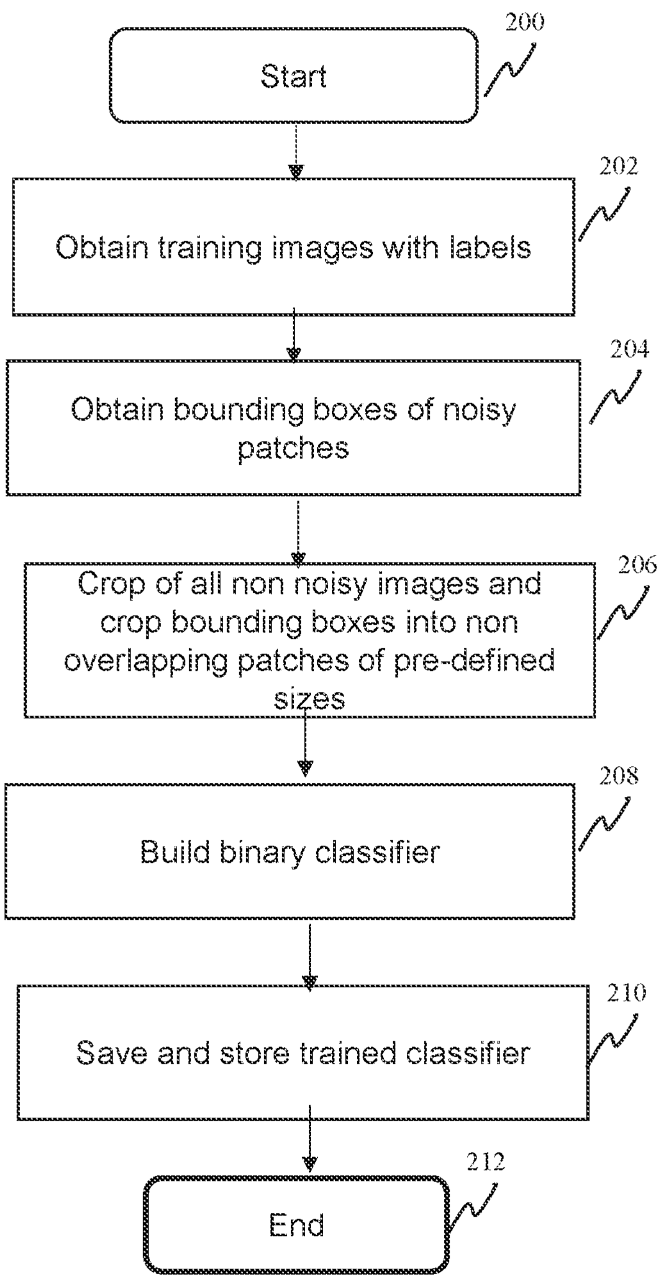
FIG. 2 is flow diagram of an image scoring algorithm of the present disclosure.

As can be seen in FIGS. 11A and 11B, the resulting accuracy from the trained model according to FIG. 2 which includes the batch normalization (FIG. 11B) results in an accuracy that is higher than that of the model without the batch normalization (FIG. 11A) based on two confusion matrixes with FIG. 11B showing less false positive and false negatives when compare to FIG. 11A. Additional training and testing accuracy curves show more stable patterns in FIG. 11B vs FIG. 11A, which gives more confidence in stability of predictions due to lower variation in error.

Figure 3:
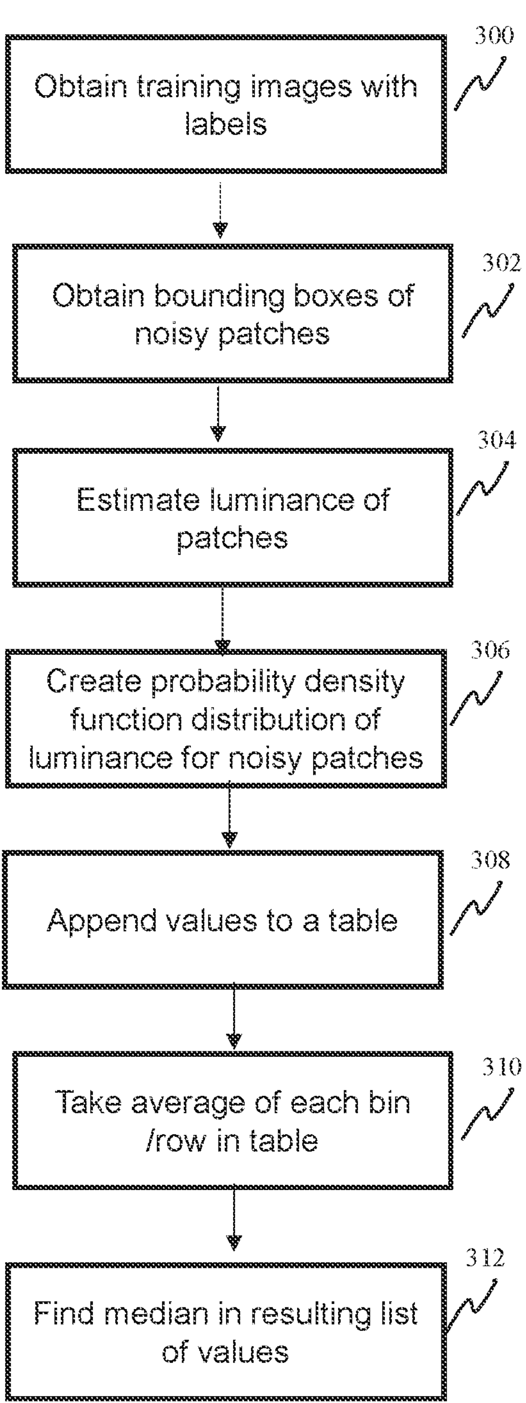
FIG. 3 is flow diagram of an image scoring algorithm of the present disclosure.

In order to improve the ability to classify an image as noisy or non-noisy, the algorithm advantageously segments the image to be processed to identify subsections of the image which are the best segments of that image to detect noise. FIG. 3 illustrates an algorithm detailing the processing for discovery and estimation of a best area in an image to processed in order to detect noise in that image. In step 300 a set of images to be processed for noise detection are obtained. In one embodiment, these images are obtained from a storage of an image capture device or a mobile computing device (e.g. smart phone). In another embodiment, the images obtained are selected via an application executing on a processing apparatus that has access to a storage having images stored therein. In step 302, bounding boxes for segments (or patches) of the image which are noisy areas are selected and saved. In step 304, luminance of resulting crops is estimated by reading image in as a 3 dimensional array and taking a dot product of 3 dimensions (Red, Green and Blue channels of image) values, creating a 1 dimensional array shown in Table 1.

TABLE 1

| [R array, G array, B array].dot([0.2126, 0.7152, 0.0722]) |
|---|

In step 306, calculation is performed to obtain a distribution of all pixel values from resulting array. This distribution produced with bins ranging from 1 to 255 representative of all pixel values. In step 308, normalization of the distribution is performed by dividing each pixel value bin count by the total count of all the values creating a probability density function distribution. An example of these steps can be seen below implemented using Python programming language:

```
import scipy.ndimage as ndi
import matplotlib.pyplot as plt
img=plt.imread("image.jpeg")
luminance=img.astype(float).dot([0.2126, 0.7152, 0.0722])
hist=ndi.histogram(luminance, min=0, max=255, bins=256)
pdf=hist/hist.sum( )
```

The results of the normalization of all patches (noisy and non-noisy) are saved in memory to a table and steps above are repeated for all samples in dataset. In step 310, an average of values in each resulting bin/row is calculated and in step 312, using cumulative sum calculation, a central point is estimated for all values resulting from step 306. FIG. 7 shows overall schematics for this process whereby the bins for each pixel value is generated in 306 and, for each row, the average value is calculated and then a cumulative sum is obtained which identifies the pixel as a central pixel for an noise evaluation area.

Figure 6:
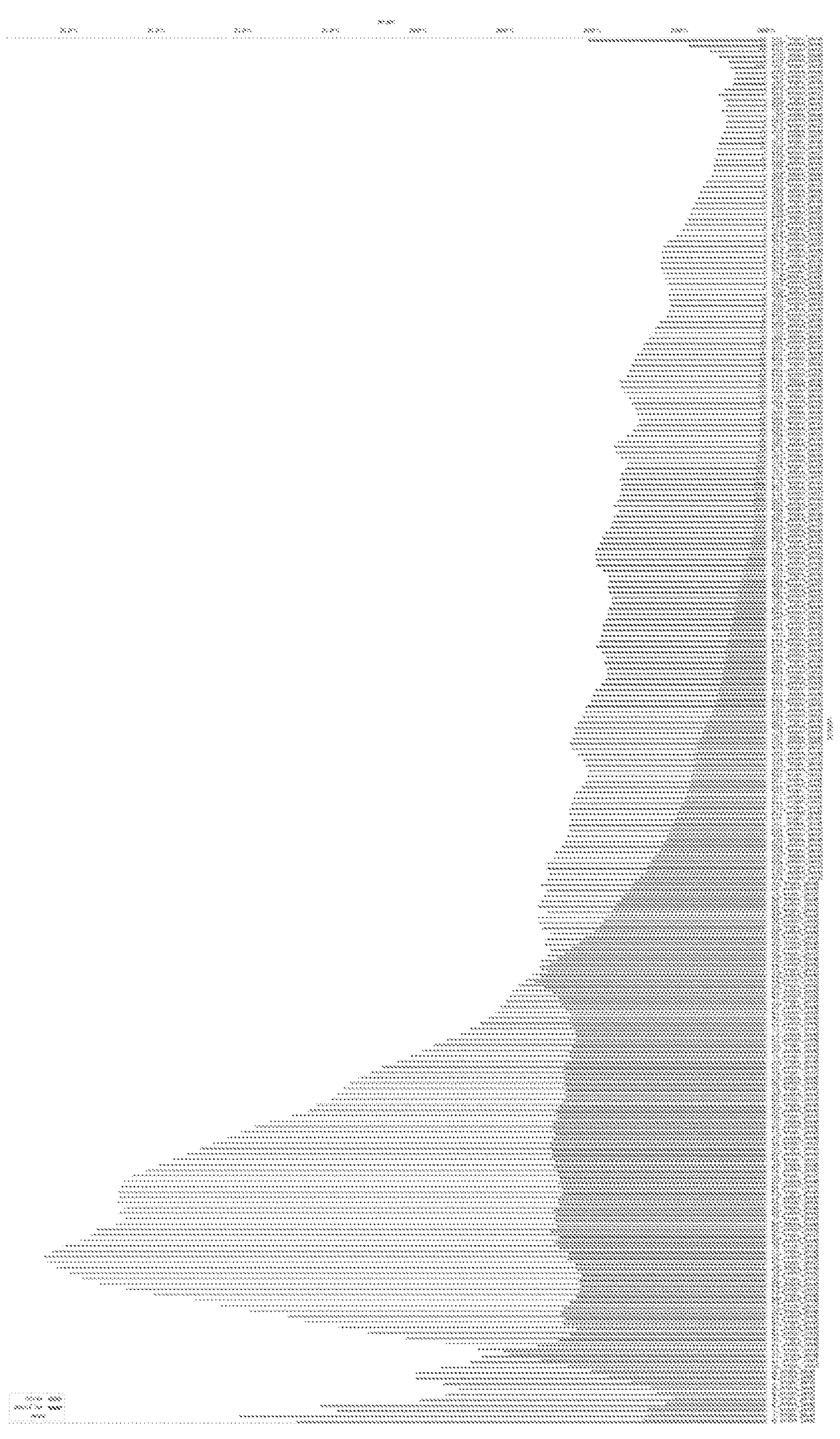
FIG. 6 is a graphical representation of luminance distributions in an exemplary image processed according to the algorithm of the present disclosure.

FIG. 6 showcases investigation of this approach and validity of such by showing significant difference in luminance distributions between noisy and non noisy image patches. FIG. 10A-10F shows performance of model on an internal validation dataset and validates better accuracy of model using areas of an image identified by the luminance maps approach outlined above vs other approaches one may use to extract areas from an image to detect noise. Across all different sampling methods above method significantly outperformed all other methods judging by weighted average precision, recall and f1 score metrics which showcase the quality of model with higher numbers resulting in better model.

Figure 4:
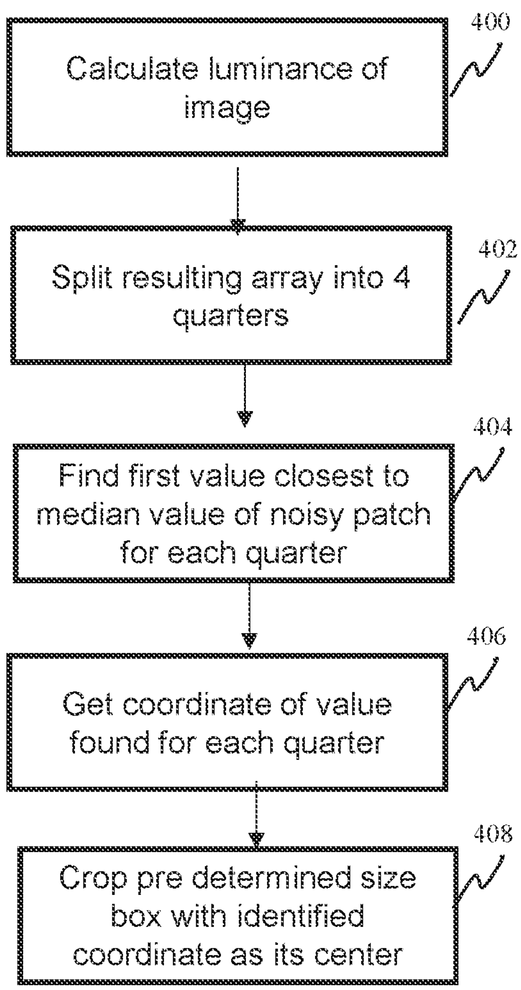
FIG. 4 is flow diagram of an image scoring algorithm of the present disclosure.

FIG. 4 illustrates the overall flow for obtaining the best patch of a particular image for evaluating noise in the image using a luminance range identified in FIG. 3. In step 400, an image is obtained and luminance of the image is calculated as described above in FIG. 3 to obtain the array. In step 402, the resulting array is divided into four quadrants. In step 404, an array with values closest to a central value of noisy luminance range distribution is produced by subtracting each value in an image's luminance array by a central noise value as output from FIG. 3 and returning absolute value of calculation for each quarter. In step 406, a first pair of X and Y coordinates corresponding to value found to be closest to a center value of noise distribution are obtained using methods similar to code snippet below implemented in Python programming language:

```
Import numpy
num=Z #pixel value to find
x=numpy.where(abs(luminance-num)==abs (luminance-num).min( ))[0] [0] #X coordinate
y=numpy.where(abs(luminance-num)==abs(luminance-num).min( ))[1] [0] #Y coordinate
```

Figure 8:
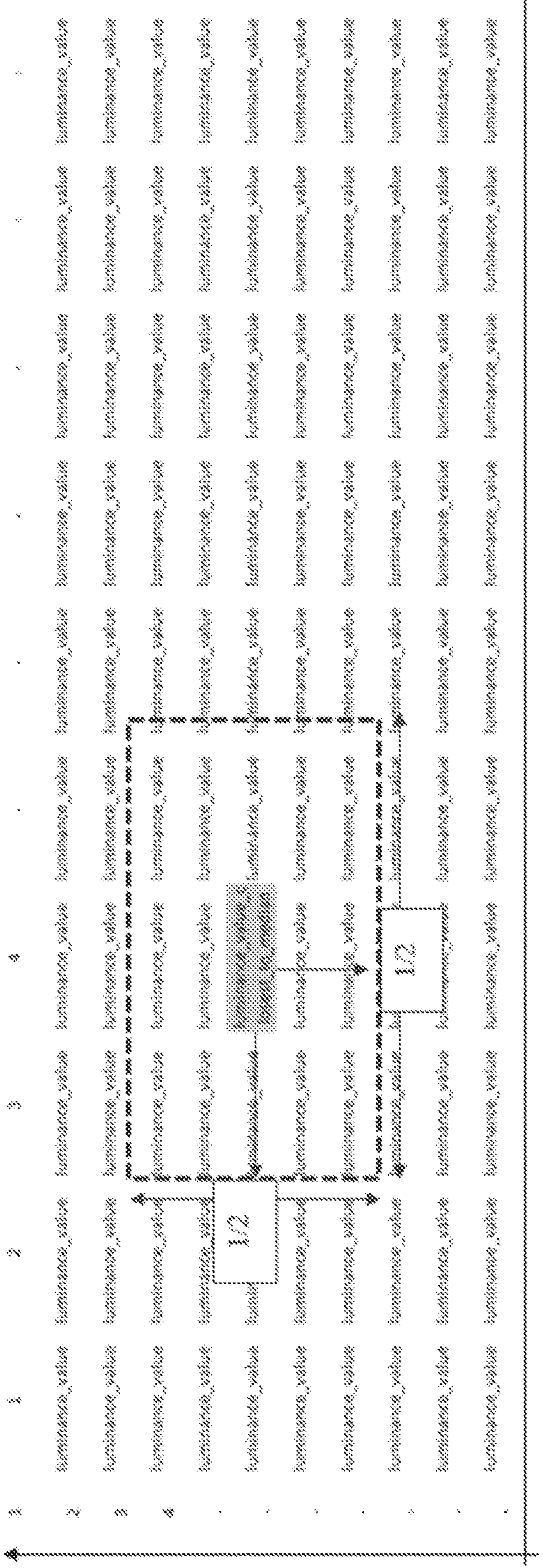
FIG. 8 is an illustrative view of the selection of the an area in an image according to the present disclosure.
Figure 9A:
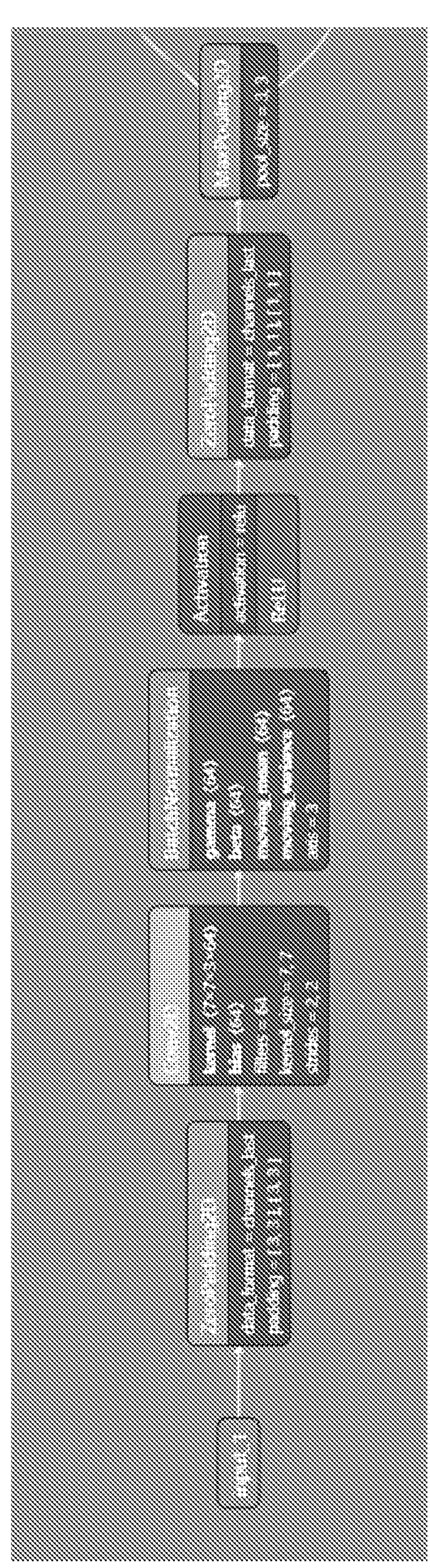
FIGS. 9A-9K illustrate an exemplary model for use by the algorithm according to the present disclosure FIGS. 10A-10F provide data comparing the algorithm according to the present disclosure with other estimation results.
Figure 9B:
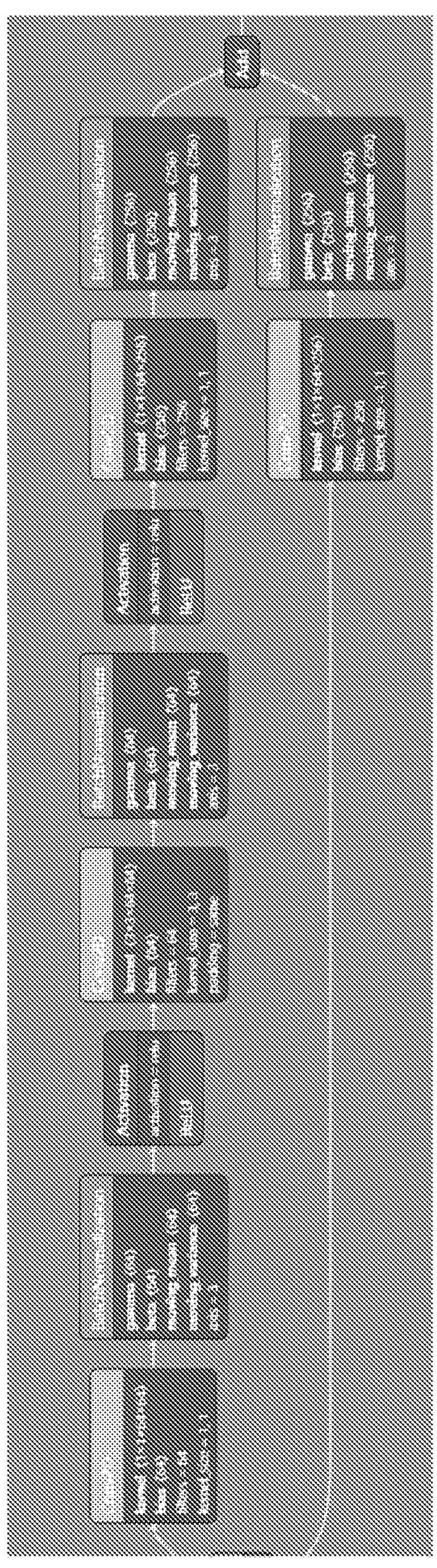
Figure 9C:
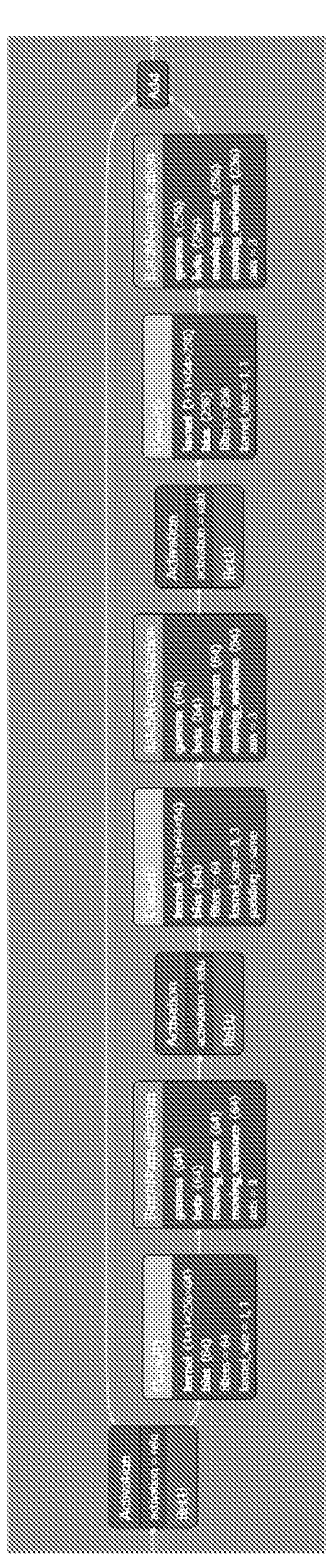
Figure 9D:
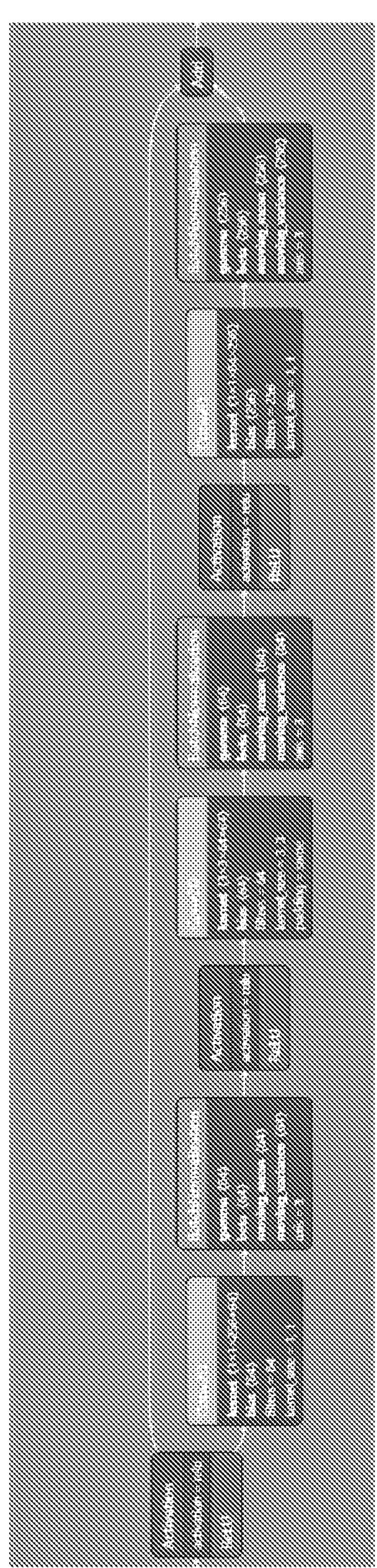
Figure 9E:
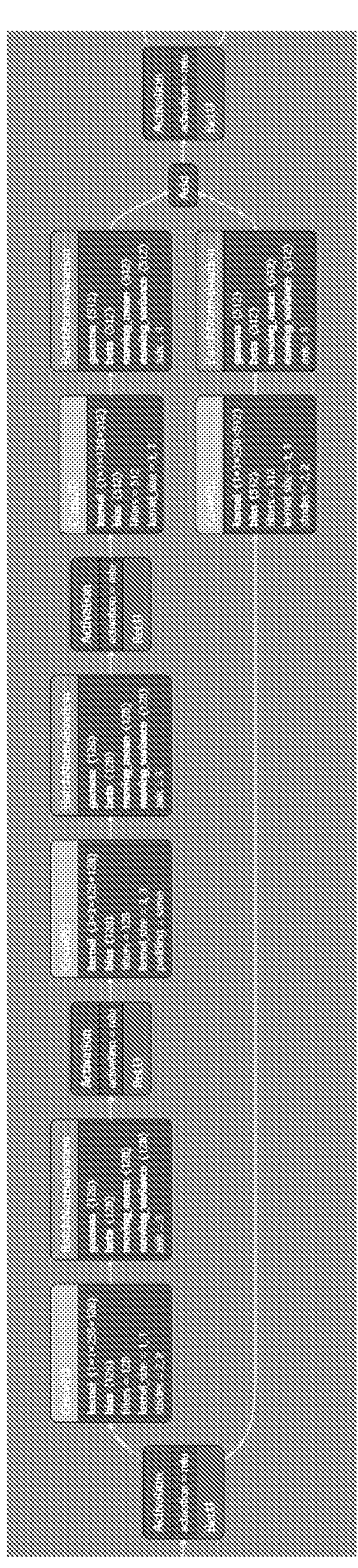
Figure 9F:
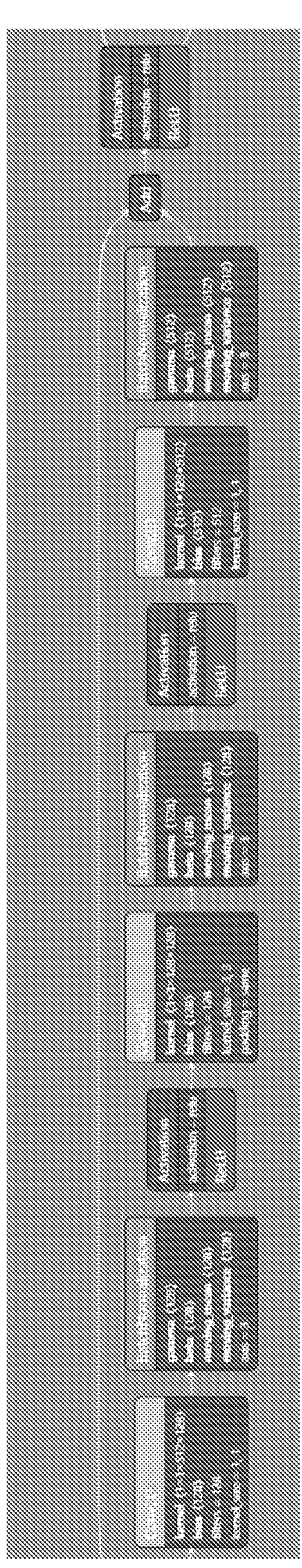
Figure 9G:
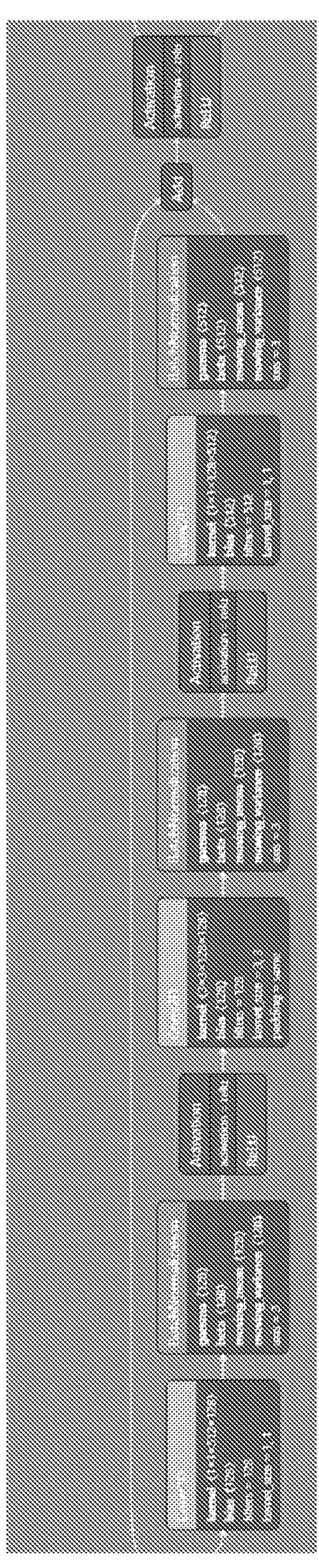
Figure 9H:
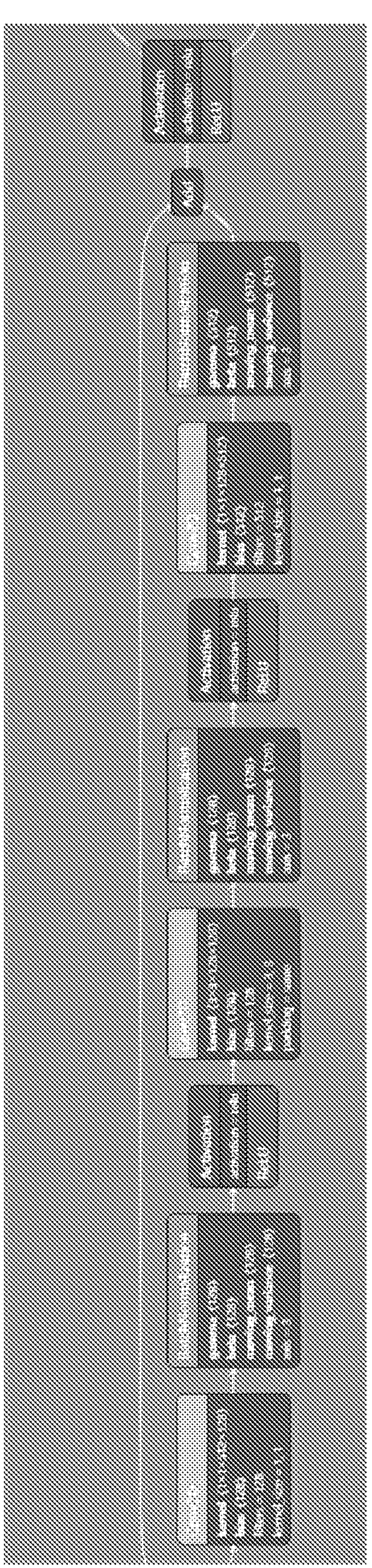
Figure 9I:
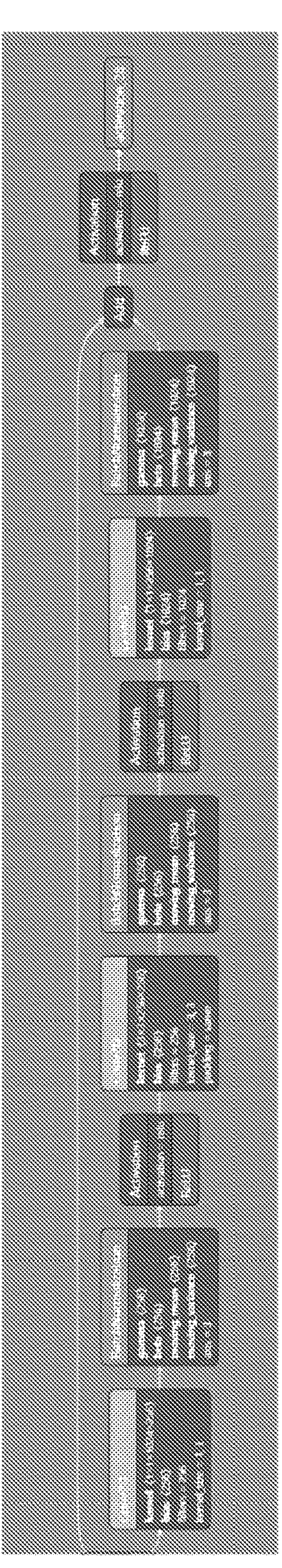
Figure 9J:
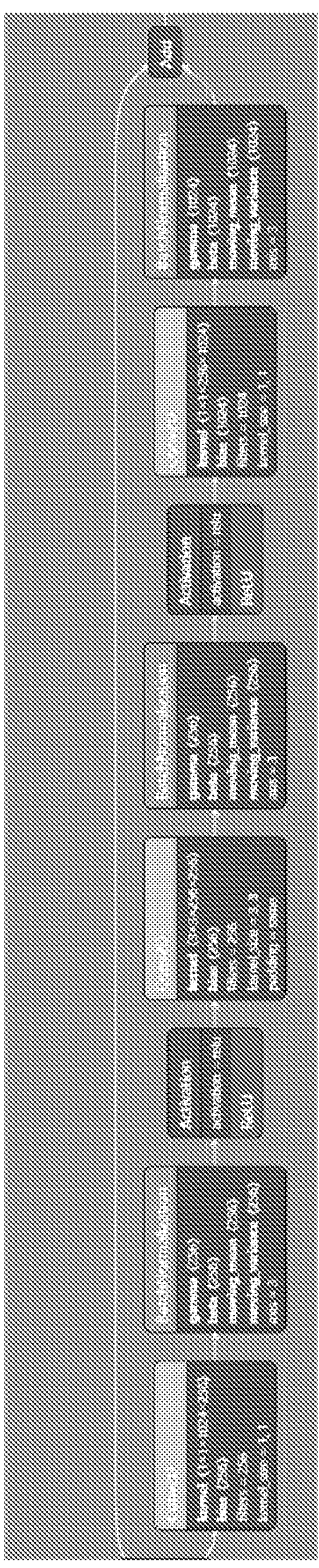
Figure 9K:
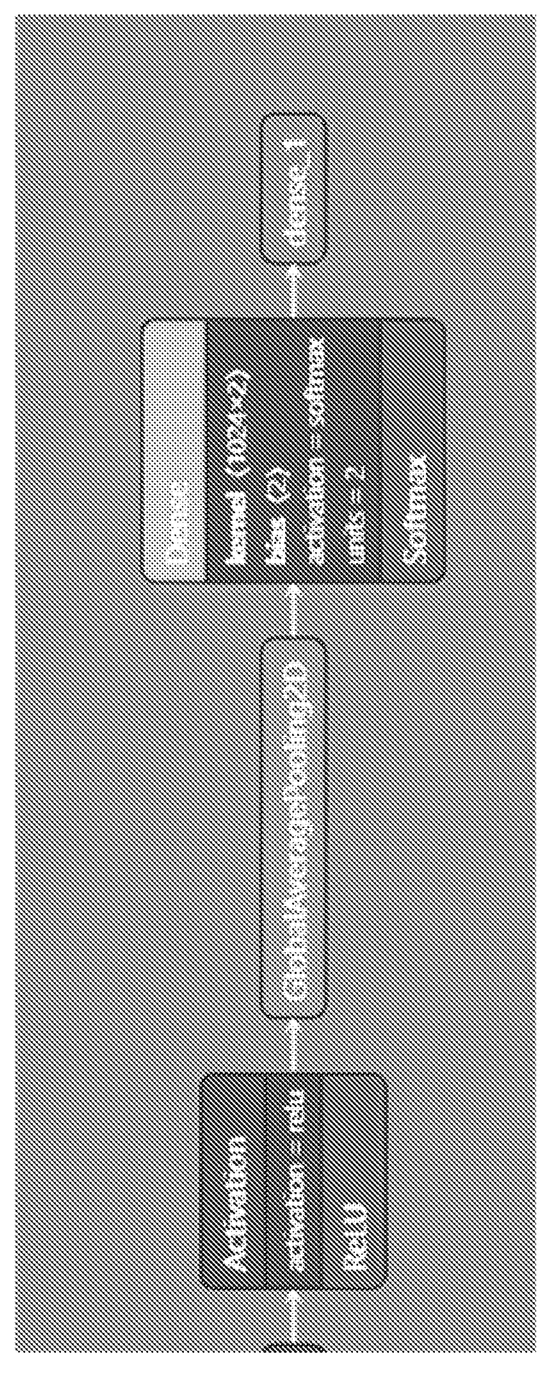
Figures 10A, 10B, 10C:
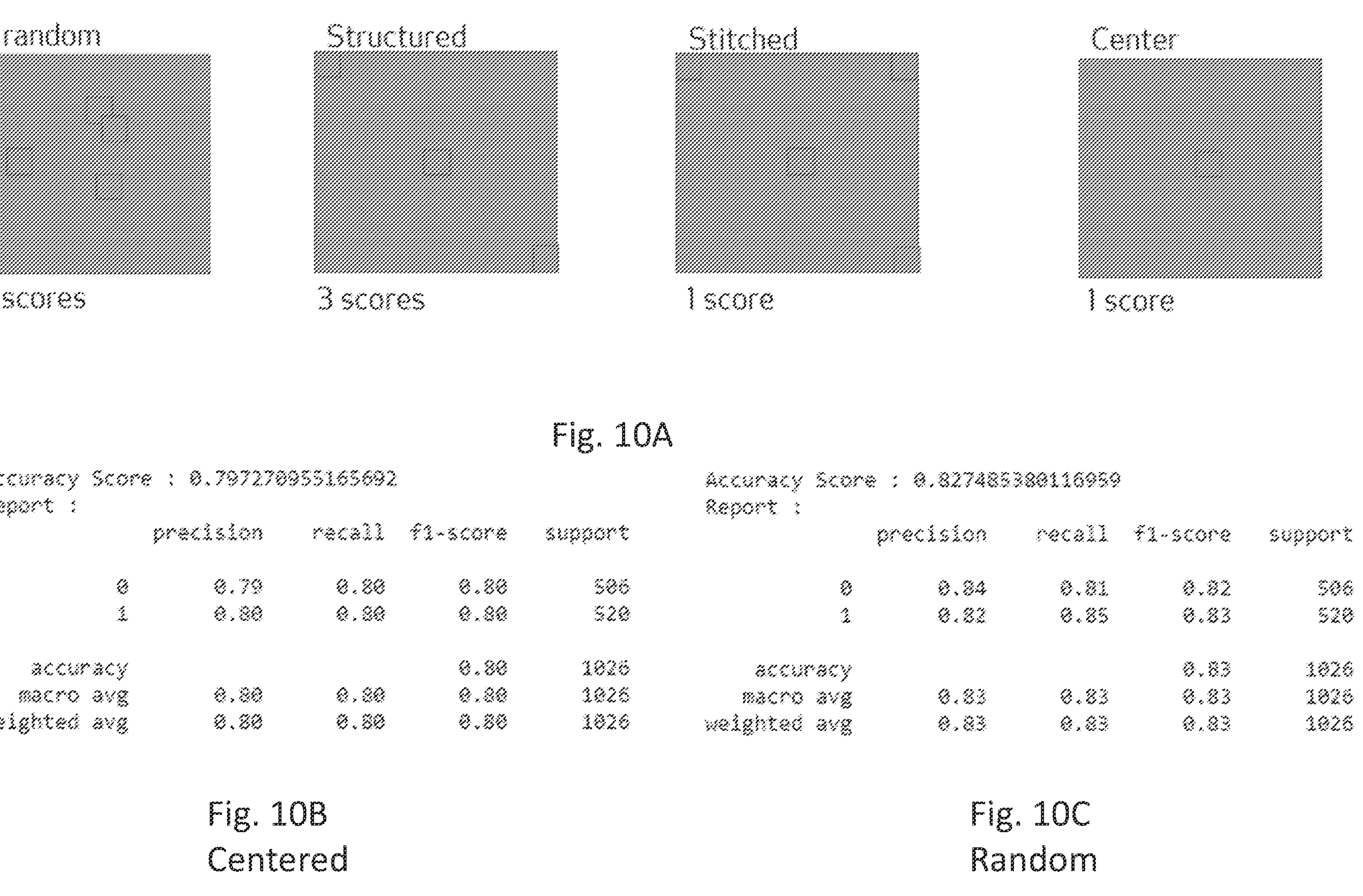

In step 408, a bounding box of predetermined size having the above determined (x,y) coordinate at its center is generated and cropped for each quarter. This operation is illustrated in FIG. 8 shows overall layout of described method. The size of the bounding box depends on the particular application and desired processing speed. In one embodiment, the size may be greater than 200×200 pixels. In another embodiment, the bounding box size may be 224×224 pixels or 256×256 pixels.

Figure 5:
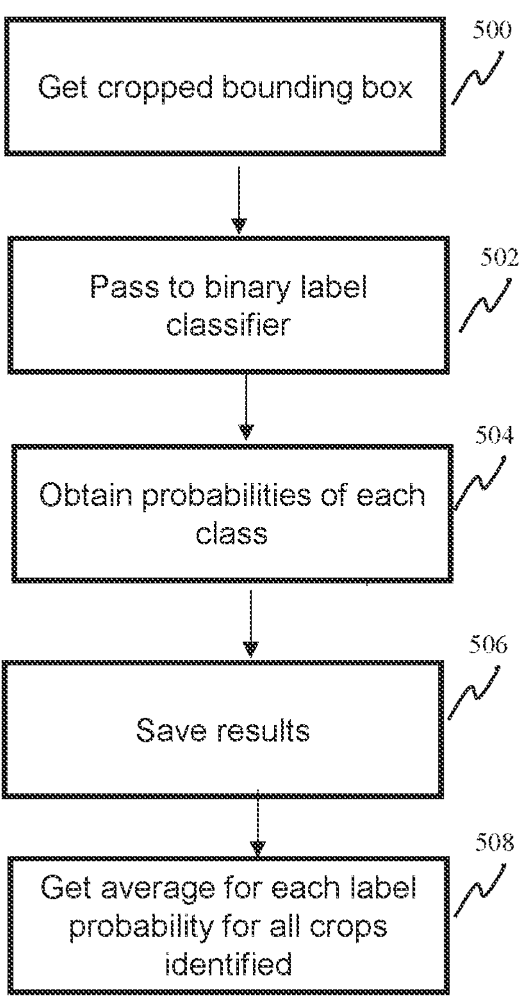
FIG. 5 is flow diagram of an image scoring algorithm of the present disclosure.

Now that the luminance values have been obtained and segments of the image being analyzed are defined by the bounding boxes described in FIG. 4, we can realize the noise estimation processing algorithm as shown in FIG. 5. In step 500 the cropped bounding boxes of predetermined size as generated in FIG. 4 are obtained for each quadrant of the image. In step 502, image data contained within the cropped bounding boxes are provided as input to the binary classifier which was trained as described in FIG. 2. In step 504, the trained classifier processes the image data provided as input to obtain a probability that the image data within the cropped region belong to a first class indicative of noise or a second class indicative of non-noise. In step 506, probability results defining each cropped area provided as input to the trained classifier are saved in memory. Steps 500-506 are then repeated for cropped regions in other quadrants. Once all quadrants are processed, an average of the saved probability results are obtained and, if the average exceeds a predetermined threshold, a label indicating whether the image is noisy or non-noisy is provided. The final label for the image is obtained based on optimal probability threshold calculated and estimated using ROC AUC curve and its highest point where the optimal cut off represents the highest true positive and the lowest false positive rates.

Figure 12A:
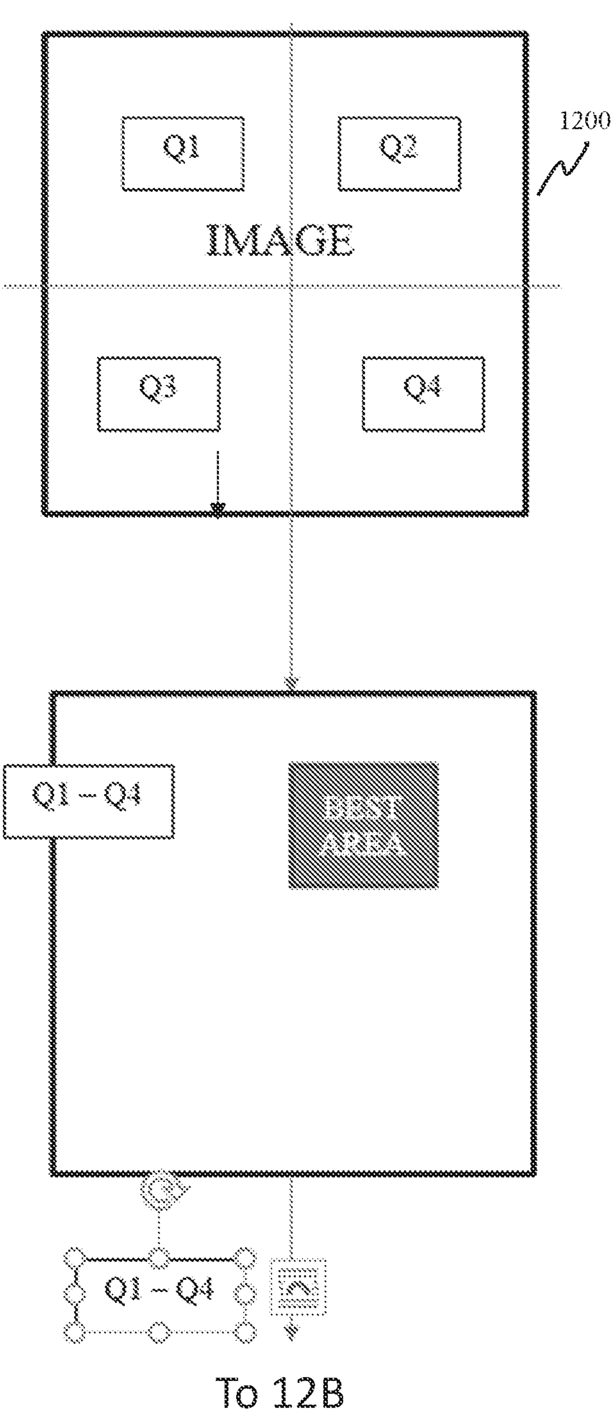
FIGS. 12A-12B are an illustrative view of the image scoring algorithm of the present disclosure.
Figure 12B:
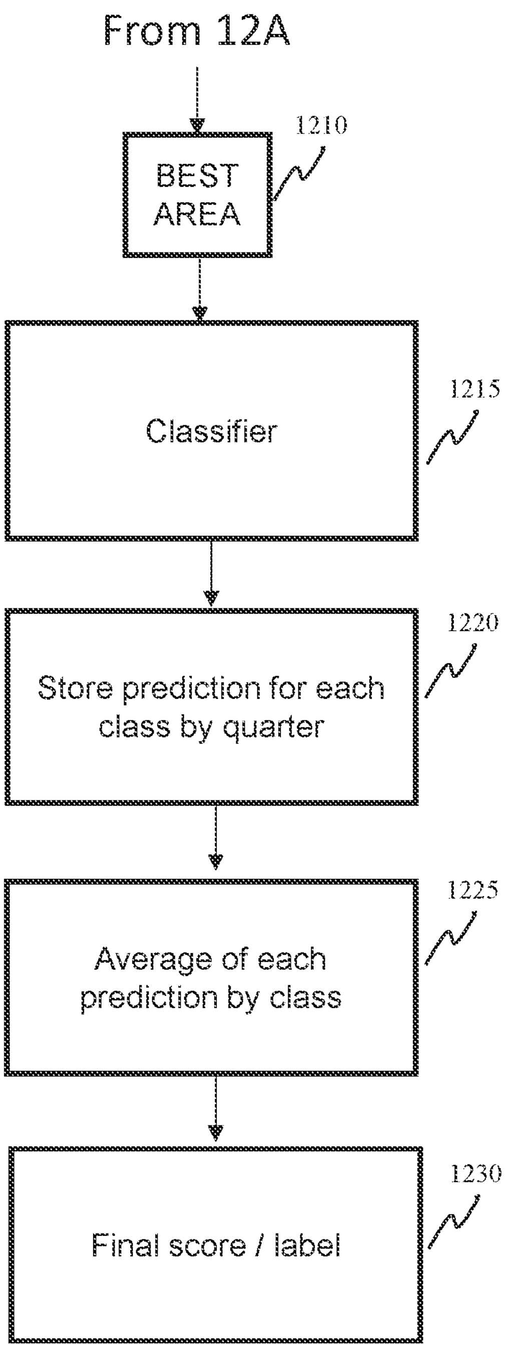

FIG. 12A-12B illustrates the overall processing described in FIG. 5. An image 1200 is segmented into four quadrants labeled Q1, Q2, Q3 and Q4. Image data in each of Q1-Q4 are analyzed based on luminance values determined in FIG. 3 that identify regions that would yield an instructive result regarding the noise of the image. A segment labeled "BEST AREA" is identified for analysis. While a single segment is shown in FIG. 12A, it should be understood that any number of segments within each one or Q1-Q4 may be generated based on the pixel value determined to be the central pixel value in the manner discussed above. This processing is repeated for each of Q1-Q4 to identify one or more best areas 1210 in FIG. 12B in the image. Image data within each area in the quadrants determined to be a "BEST AREA" is input to the classifier 1215 which generates and stores in memory the prediction 1220 of classification based on the classification of the respective image data of the particular best area input to classifier 1215. The stored prediction values are averaged by the predicted class via an averaging circuit 1225 and based on the average, a final score identifying whether the image belongs to a first class representing noise or a second class representing non-noise is assigned by comparing the average to a threshold.

Figure 13:
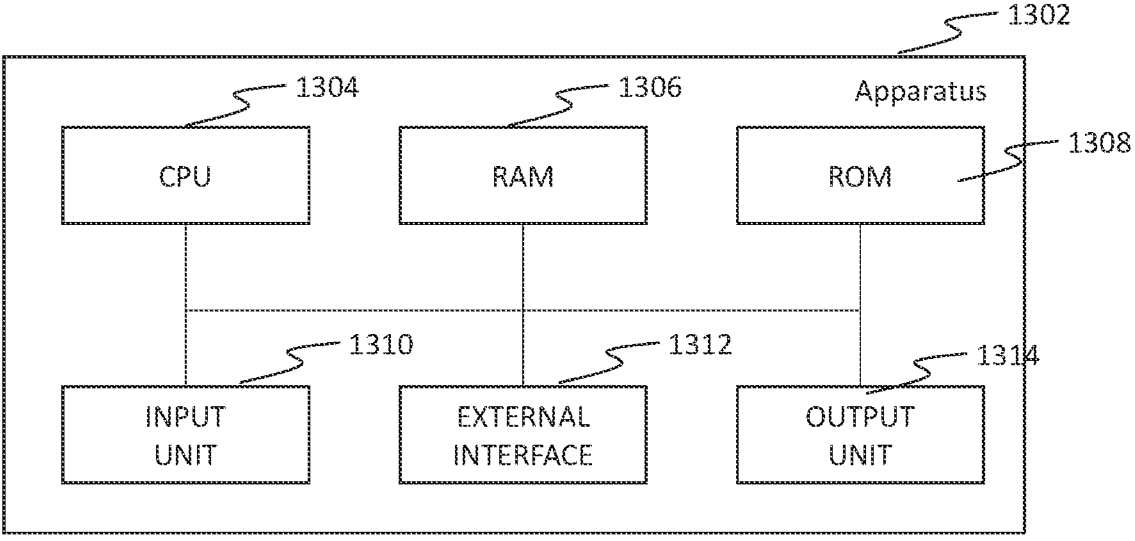
FIG. 13 is a block diagram detailing the hardware components of the unmanned autonomous vehicle.

FIG. 13 illustrates the hardware of an apparatus that can be used in implementing the above described disclosure. The apparatus 1302 includes a CPU 1304, a RAM 1306, a ROM 1308, an input unit 1310, an external interface 1312, and an output unit 1314. The CPU 1304 controls the apparatus 1302 by using a computer program (one or more series of stored instructions executable by the CPU) and data stored in the RAM 1306 or ROM 1308. Here, the apparatus may include one or more dedicated hardware or a graphics processing unit (GPU), which is different from the CPU 1304, and the GPU or the dedicated hardware may perform a part of the processes by the CPU 1304. As an example of the dedicated hardware, there are an application specific integrated circuit (ASIC), a field-programmable gate array (FPGA), and a digital signal processor (DSP), and the like. The RAM 1306 temporarily stores the computer program or data read from the ROM 1308, data supplied from outside via the external interface 1312, and the like. The ROM 1308 stores the computer program and data which do not need to be modified and which can control the base operation of the apparatus. The input unit 1310 is composed of, for example, a joystick, a jog dial, a touch panel, a keyboard, a mouse, or the like, and receives user's operation, and inputs various instructions to the CPU 1304. The external interface 1312 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 1314 is composed of, for example, a display unit such as a display and a sound output unit such as a speaker, and displays a graphical user interface (GUI) and outputs a guiding sound so that the user can operate the apparatus as needed.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An image processing method comprising:

obtaining image data stored in memory of a processing device;

defining one or more regions of the image to be processed based on luminance values of the region by subtracting each value of a determined luminance array of the image from a central luminance value to identify a central point around which a respective one of the one or more regions is defined;

providing, as input data, the one or more defined regions of the image to an classifier that has been trained to use image data to estimate noise in an image to output a prediction that the input data is in a first class or a second class;

calculating an average by predicted class; and labeling the obtained image as the first class or second class based on the calculated average.

2. The image processing method of claim 1, further comprising dividing the obtained image data into predetermined segments of image data; and wherein the defining of one or more regions of the image is performed within each of the predetermined segments.

3. The image processing method of claim 2, further comprising providing, as the input data, one or more defined regions in each of the predetermined segments to the classifier to output predictions for each of the one or more defined regions in each of the segments; and calculating the average by predicted class across all of the predetermined segments to generate the label for the image.

4. The image processing method of claim 1, further comprising generating a bounding box having a predetermined size having the identified central point at a center; and providing the image data within the generated bounding box to the classifier.

5. The image processing method of claim 1, wherein the central luminance value is a luminance value closest to a median luminance value of the image.

6. The image processing method of claim 1, further comprising outputting, on a display, the obtained image including the label.

7. An image processing apparatus comprising:

one or more memories having instructions stored therein; and one or more processors that, upon executing the stored instructions, configures the one or more processors to perform the following operations:

obtaining image data stored in memory of a processing device;

defining one or more regions of the image to be processed based on luminance values of the region by subtracting each value of a determined luminance array of the image from a central luminance value to identify a central point around which a respective one of the one or more regions is defined;

providing, as input data, the one or more defined regions of the image to an classifier that has been trained to use image data to estimate noise in an image to output a prediction that the input data is in a first class or a second class;

calculating an average by predicted class; and labeling the obtained image as the first class or second class based on the calculated average.

8. The image processing apparatus of claim 7, wherein execution of the stored instructions further configures the one or more processors to perform operations including dividing the obtained image data into predetermined segments of image data; and wherein the defining of one or more regions of the image is performed within each of the predetermined segments.

9. The image processing apparatus of claim 8, wherein execution of the stored instructions further configures the one or more processors to perform operations including providing, as the input data, one or more defined regions in each of the predetermined segments to the classifier to output predictions for each of the one or more defined regions in each of the segments; and calculating the average by predicted class across all of the predetermined segments to generate the label for the image.

10. The image processing apparatus of claim 7, wherein execution of the stored instructions further configures the one or more processors to perform operations including generating a bounding box having a predetermined size having the identified central point at a center; and providing the image data within the generated bounding box to the classifier.

11. The image processing apparatus of claim 8, wherein the central luminance value is a luminance value closest to a median luminance value of the image.

12. The image processing apparatus of claim 8, wherein execution of the stored instructions further configures the one or more processors to perform operations including outputting, on a display, the obtained image including the label.

* * * * *